Feb. 21, 1933.  T. R. HARRISON  1,898,182
AUTOMATIC CONTROL SYSTEM AND APPARATUS THEREFOR
Filed March 25, 1924  2 Sheets-Sheet 1

Inventor
Thomas Randolph Harrison
By William A. Strauch
Attorney

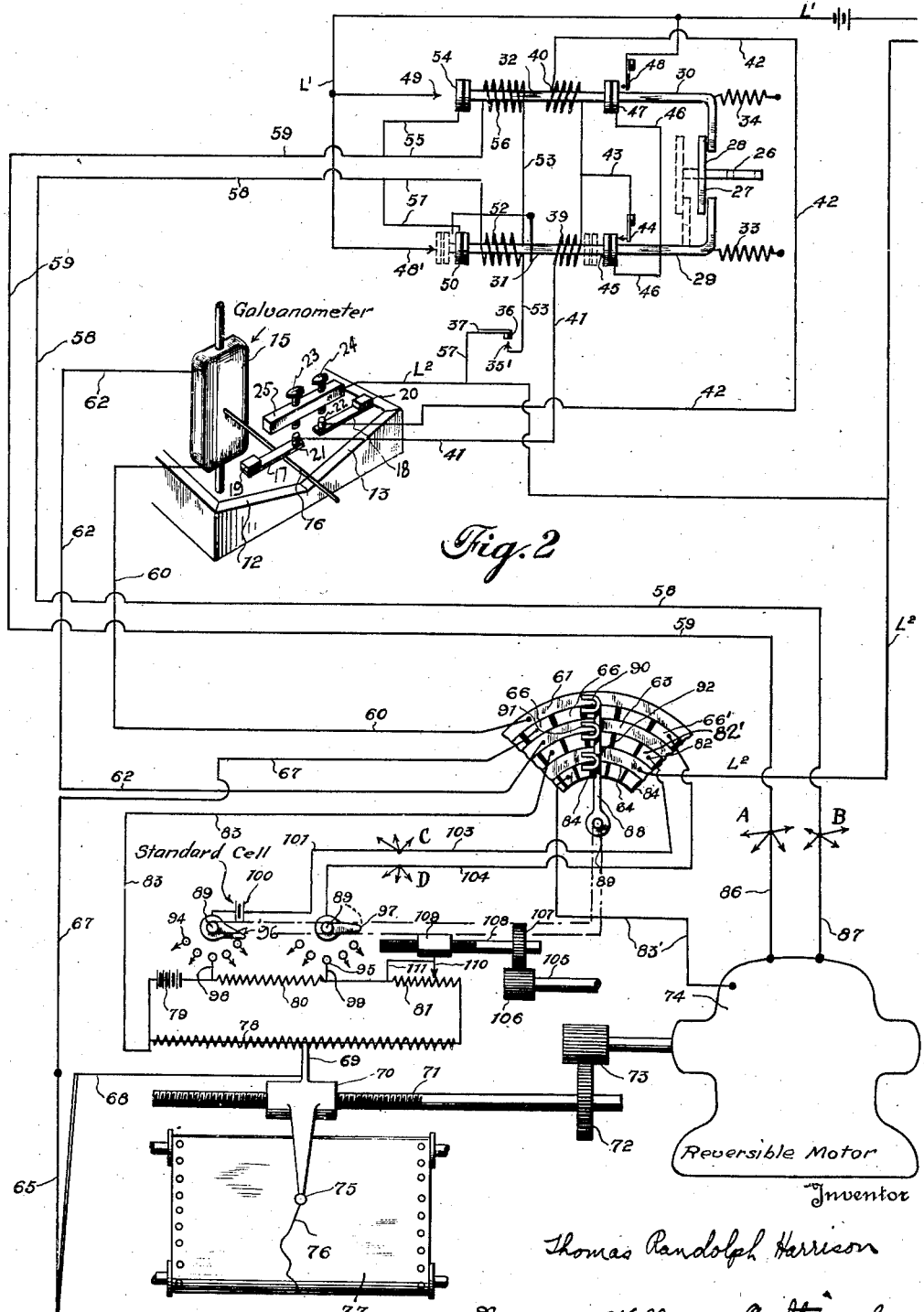

Patented Feb. 21, 1933

1,898,182

UNITED STATES PATENT OFFICE

THOMAS RANDOLPH HARRISON, OF PHILADELPHIA, PENNSYLVANIA, ASSIGNOR TO BROWN INSTRUMENT COMPANY, OF PHILADELPHIA, PENNSYLVANIA, A CORPORATION OF PENNSYLVANIA

AUTOMATIC CONTROL SYSTEM AND APPARATUS THEREFOR

Application filed March 25, 1924. Serial No. 701,829.

The present invention relates to improvements in automatic control systems and apparatus therefor.

More particularly the invention relates to systems of and apparatus for controlling recorders, switches, motors, valves, rheostats, and like devices in response to mechanical, chemical, electrical, or other physical changes of conditions in order to effect a record of the changes, or to maintain predetermined physical conditions at controlled points.

The invention is particularly useful in connection with pyrometric or temperature recording and control systems where it is desirable to record in a common instrument or control room the conditions of temperature at one or more remote points, for example in furnaces, so that the conditions at said points may be regulated or controlled either by manually operated means from the control room; or by manually operated means at the furnaces or other controlled points in accordance with signals or other instructions from the control room; or by automatic operation of switches, motors and the like from the central point or control room. In this manner the more or less delicate controlling mechanisms may be placed in a location free from vibration, dust, deteriorating gases and the like, and may conveniently be kept in proper operating condition. A further advantage results in that where the conditions at many points are to be recorded or controlled and the conditions at such points are not subjected to rapid variations, parts of the central or control apparatus may be utilized by suitable switching arrangements in a manner to be common to the various controlled furnaces or points.

A still further advantage results from the fact that a minimum number of high grade employees can control an entire plant and insure proper correlation of activities at the various points, while lower grades of manual labor may be employed at the furnaces.

Although various systems and apparatus have been proposed for effecting the operations above outlined, these prior systems have been more or less inaccurate in operation, complicated in structure, lacking in durability, and easily disarranged. Such prior systems have utilized more or less sensitive galvanometers which are operated by currents too weak in themselves to perform the desired functions of recording or control, as for example, currents produced by thermo-couples. These galvanometers have been provided with needles which co-act with periodically operating mechanical means to produce varying degrees of controlling motion, and varying speeds of motion of mechanical members, depending on the amount and direction of deflection of the needles. So far as known, none of the prior devices utilize the principle of differentiating in accordance with the invention disclosed and claimed herein between the various degrees of movement effected according to variations in the length of time during which adjustments are effected at substantially uniform instead of varying speeds.

It has been the practice heretofore in pyrometric recorder circuits to restort to potentiometer circuit arrangements in order to effect the balance necessary for recording the conditions, and where potentiometer circuits are utilized a periodic adjustment or balance of the circuit against a standard cell must be made to insure accuracy. A well known type of potentiometer circuit and balancing means has been adapted for use with the present invention in one form thereof.

A novel balancing rheostat arrangement has also been provided whereby the necessity for a standard cell and regulation of the rheostat is obviated in this form.

In circuits involving a number of thermo-couples, it has been the practice to connect the thermo-couples successively to a common recorder by means of a switch operating at a uniform speed, and having an individual record made for each couple on a common sheet. In such arrangements the individual circuits are not brought to a balance before the switch moves to the next circuit unless enough time is allotted to each adjustment to make a full scale adjustment. The invention disclosed herein includes means and methods for bringing each circuit to a complete balance, before the switch is moved to the succeeding circuit, which are broadly novel with me and are not claimed herein, but are claimed in my copending application, Ser. No. 146,141, filed November 4, 1926.

A further improvement is effected in providing a recorder individual to each circuit rather than making the entire record on a common sheet. When the balancing rheostat arrangement is utilized, sufficient current may be derived to directly actuate a recording ammeter of any well known type, graduated to record directly in temperature or other constants. It will be understood that the various improved subcombinations are adaptable for use with the known arrangements and are not limited to the combinations disclosed in the preferred forms.

The objects of the invention are to provide simplified and more efficient, more accurate, and more rugged and reliable methods and apparatus for controls and recorders of the character described, and such other objects as may be attained by the utilization of apparatus and principles hereinafter set forth in the many relations to which the combinations and subcombinations and their equivalents may be adapted by those skilled in the art.

Referring to the drawings—

Fig. 2 is a distorted diagrammatic disclosure of the arrangement in Fig. 1 as applied to one form recorder arrangement.

Figures 1, 3:
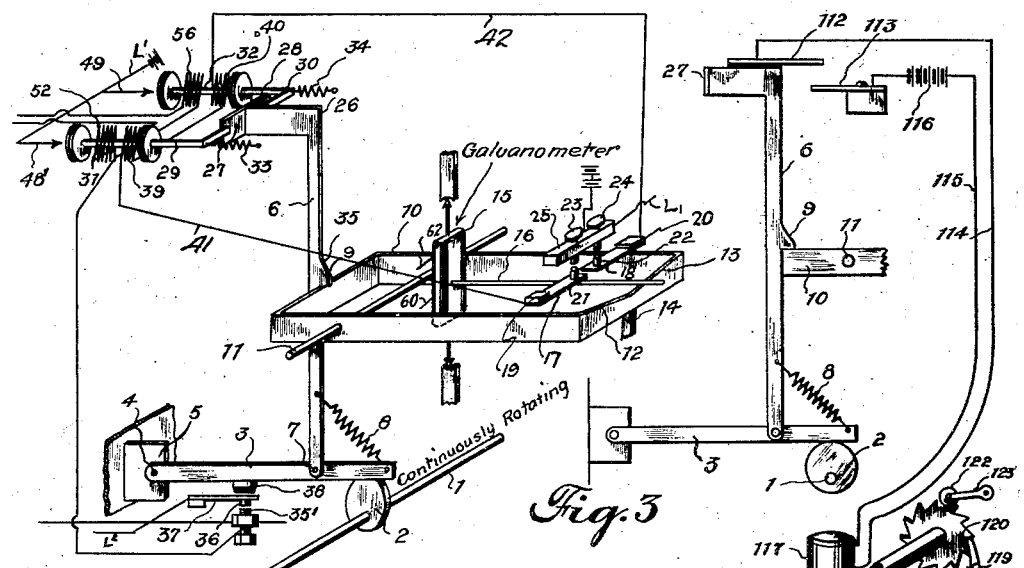
Fig. 1 is a more or less diagrammatic disclosure of the essential elements of the galvanometer arrangement and mechanical control, together with one form of switch circuit.
Fig. 3 shows a modified switching arrangement.

In Fig. 1, 1 represents a shaft rotated at a uniform rate of speed by any suitable means, not shown, and has secured thereto an eccentric actuating cam 2 which by its rotation rocks an arm 3 vertically about pivot 4 secured to a suitable fixed support 5. A vertical member 6 is pivoted to arm 3 at 7 and is urged to the right in Fig. 1 by a tension spring 8. A projecting lug 9 is provided and forms a shoulder adapted to hook over and engage a frame 10 which in turn is pivotally mounted on a spindle 11. The front edge of frame 10 is provided with inclined upper edges or surfaces 12 and 13 in a manner to form a shallow V-shaped depression therein. A suitable fixed stop 14 is provided to limit the downward movement of frame 10. A galvanometer 15 pivoted for horizontal movement, is so arranged that the needle 16 thereof swings directly over the surfaces 12 and 13 when the galvanometer is deflected and when the galvanometer is in normal position, the needle will be directly over the point of the V in the center of the frame. A pair of contact springs 17 and 18 suitably supported from fixed blocks 19 and 20 are arranged above frame 10 in a manner not to interfere with the pivotal movement of the frame, and so that as the frame is raised if the needle is in central position, neither of the springs will be engaged by the needle, but if the needle is deflected, at the proper instant, varying with the amount of deflection, the needle will engage and force one or the other of springs 17 or 18 upward. Upward movement of the springs 17 and 18 causes the contacts 21 and 22 to engage adjustable contacts 23 and 24 carried in the conducting bus member 25. Formed integrally with or secured to the upper end of member 6 is an extension 26 with wings 27 and 28. A pair of hook members 29 and 30 carried by electromagnetic switches 31 and 32 are so arranged that when the switches are actuated, and moved against the tension of springs 33 and 34, members 29 and 30 will be moved to the left in Fig. 1; engaging wings 27 and 28 and member 6 will be moved about its pivot 7 against the tension of spring 8 until the shoulder formed by 9 is disengaged from the upper rear edge of frame 10. This movement of member 6 permits frame 10 to drop until arrested by stop 14. The width of wings 27 and 28 is such that the vertical movement thereof will not be sufficient to effect the release thereof, and member 6 will be held to the left in Fig. 1 as long as either switch is actuated, but will be free to move vertically under the influence of cam 2. When both switches are released and return to the position shown in Fig. 1, under the influence of springs 33 and 34, spring 8 will move member 6 to the right in Fig. 1 and as it is raised cam surface 35 will force it to the left until the shoulder formed by projection 9 is free to slide over and re-engage the upper rear edge of frame 10, as shown in Fig. 1 at approximately the upper limit of the movement of member 6.

The switches 31 and 32 may be of any well known electromagnetically actuated trip release type, which when thrown into actuated position, will remain set until released by an electromagnetic release circuit. Since such switches are supplied by well known electrical companies and are well understood in the art, more detailed disclosure will not be made. The actuating circuits for the switches 31 and 32 are controlled by contacts 21 and 23, and 22 and 24 respectively, while the release circuits therefor are controlled by contacts 35' and 36. Contact 36 is carried on a spring 37 which is depressed to close the contacts by an actuating member 38 preferably of insulating material carried by member 3, when member 3 is in its lower position. See Figure 1. The mechanism of the control instrument shown in Fig. 1 is the same as that of Fig. 2, Fig. 2 complementing Fig. 1 by showing more completely the electrical circuit.

Actuating coils 39 and 40 of switches 31 and 32 each have one terminal thereof connected by means of conductors 41 and 42 to contacts 21 and 22 respectively, and, as shown in Fig. 2, the other terminals thereof are connected to a common lead 43 through spring contact 44, insulated contact plate 45 of switch 31 in unactuated position, through conductor 46 to contact plate 47 of switch 32, to spring contact 48 in unactuated position of switch 32 to one side of a power supply line $L^1$. The other side of the power supply line $L^2$ is connected directly to contacts 23 and 24 through bar 25, so that when both switches are unactuated, closure of contacts 21 and 23 will complete a circuit through coil 39 and actuate switch 31, and closure of contacts 22 and 24 will energize coil 40 to actuate switch 32. The movement of either switch will be followed for an interval by springs 44 or 48 to maintain the energizing circuit long enough to set the switch, but before contacts 22 or 23 are moved to open their respective actuating circuits, these circuits will be interrupted at 44 and 48 respectively due to the movements of the switches 31 and 32, so that breaking of the circuits always occurs at relatively heavy switch contacts 44 and 45, and 47 and 48, it being understood that contacts 45 and 47 are movable with the switches and properly insulated. In this manner destructive arcing at contacts 22 and 24 is prevented and the life thereof is considerably prolonged.

When the switches 32 and 31 reach actuated position (as shown in Fig. 2 by the dotted lines for 31) they will engage contacts 48' and 49 respectively and be held in actuated position by means of magnetically controlled releasing trips (not shown). Contacts 48' and 49 are connected directly to $L^1$ and in actuated position of the switch 31, contact is made from contact 48' through insulated switch contact 50 through conductor 51 to trip release coil 52, through coil 52 to conductor 53 to release circuit control contact 35'. In actuated position of switch 32 contact is made from contact 49 through plate 54 thereof, through conductors 55 through coil 56 to conductor 53 and contact 35'. When contact 36 is closed by operation of member 37, an energizing circuit is completed from $L^2$ through conductor 57 to spring 37, contact 35', and through the release coil 52 or 56 of the actuated one of switches 31 or 32, thereby actuating the releasing trips to permit the restoration of the actuated switch to unactuated position. The conductors 58 and 59 branch from the conductors 51 and 55 respectively and may control remote motors, circuit breakers or the like.

The operation of the contacting galvanometer apparatus so far described is as follows.

Shaft 1 and cam 2 maintain member 6 in continual vertical reciprocating motion. The parts are so proportioned that with the rear upper edge of frame 10 engaging the shoulder formed by projection 9, the weight of members 3 and 6 and the connected parts is such as to overbalance the weight of frame 10 and the galvanometer parts so that as 6 descends the front end of the frame and galvanometer needle 16 will rock upward, but when cam 2 causes member 6 to move upward, the front of the frame will drop until it engages stop 14. If the galvanometer needle is in central position as it is moved upward it will pass between the ends of springs 17 and 18 and no effect on the switches will be produced. If, however, the needle is deflected it will be engaged by edge 12 or 13 depending upon whether the deflection is left or right, and as the upward movement continues, the needle will engage one or the other of springs 17 or 18, and will close one or the other set of contacts 21 and 23, or 22 and 24, and this closure of contacts will energize coil 39 or 40 as the case may be, through the circuits above traced out, to actuate one or the other of switches 31 and 32, and thereby complete a control circuit through conductor 58 or conductor 59 as above set forth.

Actuation of either switch pulls member 6 to the left in Fig. 1 through operation of extension 29 or 30 on wings 27 or 28, so that the shoulder formed by 9 is disengaged from the upper rear edge of frame 10, and as soon as either switch is actuated, the frame is permitted to drop thereby freeing needle 16 to assume a new position. It will be noted that the movement of contacts 21 and 22 may be short owing to the fact that interruption of the circuit established by these contacts always occurs at contact 44 or 48 of the switches, and in this manner the needle is free to deflect for a major portion of the time of each cycle, and is gripped only during the time required to actuate the switch which is of very small duration. The weight of the parts is relatively so small, that no injury is occasioned to the needle in event of the parts sticking or the switches failing to function. The parts will simply remain suspended while the cam drops away from member 3 without injury thereto.

The setting or actuation of either switch 31 or 32, as above set forth, partially closes a trip circuit through its release coil 52 or 56, and when member 3 approaches the lower limit of movement the contacts 35' and 36 are closed and release the actuated switch so that it may return under the influence of its spring to unactuated position and close the circuits for coils 39 and 40 at contacts 44 and 48. The upward movement of member 6 after restoration of the actuated switch, by rotation of cam 2, will force member 6 to the left due to the engagement of surface 35 thereof with the rear of frame 10 until the upward limit of movement is approximately reached at which point the shoulder formed by projection 9 will slide over and reengage the upper rear edge of frame 10, and the cycle of operation will be complete. Member 6 and the connected parts will again move downward causing the upward movement of the front of frame 10 in another cycle of operation.

Owing to the relative inclinations of edges 12 and 13, it will be clear that the point in the cycle at which the needle 16 will close the contacts 21 or 22 will vary with the amount of deflection of the needle, and the greater the deflection, the earlier in the cycle, the switches 31 and 32 will be actuated. Inasmuch as the release of the switches 31 and 32 always occurs at the same point in the cycle, it will be apparent that the time during which the switches are closed will be directly determined by the amount of deflection of the galvanometer. It will also be clear that although with the arrangement shown, the maximum time that the switches remain closed is the approximate time of one half a revolution of cam 2, this maximum time may be lengthened by causing cam 2 or another cam to close the contacts 35 and 36 at a later point in the cycle, but in sufficient time to release member 6 so that, the shoulder formed by 9 may re-engage the upper rear edge of frame 10 at the beginning of a cycle.

Having described a preferred form of controlling or contacting galvanometer arrangement, applications of this control to recording systems will be disclosed. In Fig. 2, the mechanism and circuits so far described, are shown with parts broken away on the upper half of the sheet. One terminal of the galvanometer 15 is connected through conductor 60 to a conducting ring 61 of a rotary switch, and the other terminal is connected by means of conductor 62 to conducting ring 63 of the rotary switch. The line conductor L² is connected directly to conducting ring 64 of the rotary switch. A plurality of thermocouples 65 located at different points, one only of which is shown, each have one terminal thereof connected to one of the contacts 66 of the distributor or rotary switch by conductors 67, it being understood that each contact 66 is insulated from all of the other contacts and rings on the distributor face. The other terminal of each thermocouple is connected by means of conductors 68 to the traveling contactor 69 of a recorder individual thereto. This recorder is preferably of a type similar to the Westinghouse type M. Graphic Meter or like instrument, and in general may comprise a traveling member 70 upon which 69 is mounted, and which in turn travels upon a screw threaded shaft 71 which is driven through gears 72 and 73 from a reversing motor 74. Traveling member 70 carries a pen 75 which traces a record 76 on record sheet 77, as determined by the movement of the sheet and the movements of the pen. The slider 69 travels over a resistance slide wire 78 of a potentiometer arrangement which comprises the battery 79, the fixed resistance 80 and the adjustable or compensating resistance 81 all connected in series. The potentiometers are each connected to a separate and insulated contact 82 of the distributor by conductor 83. One terminal of each motor reversing circuit is connected by conductors 83' to a separate and insulated contact 84 of the distributor, and the other terminals of the motor reversing circuits are connected by conductors 86 and 87 at common points A and B, to the leads 58 and 59 from switches 31 and 32 respectively. Distributor brush arm 88, mounted on shaft 89 is provided with brushes 90, 91 and 92 insulated from the arm and from each other. Brush 90 connects contacts 66 to ring 61, brush 91 connects contacts 82 to ring 63, and brush 92 connects contacts 84 to ring 64. Shaft 89 is rotated in the usual manner at a uniform speed, or by special means hereinafter described, and connects each thermocouple and its individual recorder successively to the contacting common galvanometer and common switches 31 and 32.

As a potentiometer is utilized for each recorder, it becomes desirable to periodically adjust the potentiometers against a standard cell. This adjustment may be effected manually if desired, but is preferably effected automatically. For automatic adjustment, a pair of rotary distributor switches with contacts 94, and 95, and brushes 96 and 97 are provided. Brushes 96 and 97 are carried on shaft 89, or rotated otherwise in definite timed relation with respect to arm 88. The contacts 94 and 95 are connected to the ends of the potentiometer resistances 80 by conductors 98 and 99. Brush 96 is connected through a standard cell 100 to a common point C, and arm 97 is connected by conductor 102 to a common point D. Point C is connected by conductors 103 to separate distributor contacts 82, one for each potentiometer to be adjusted, and point D is connected by separate conductors 104 to separate distributor contacts 66', one for each potentiometer to be adjusted. It will be understood that the set of contacts for the potentiometer adjustments and the set for the individual recorder circuits may be chosen in any two sectors of the distributor and are spaced apart for convenient illustration, but in practice it will be preferable to adjust the potentiometer just before the recorder individual thereto is connected to the common galvanometer and switches. Contact 84 of the potentiometer may be connected to the lead 83' of a separate reversible motor similar to motor 74 which separate motor drives shaft 105, pinion 106, gear 107 and screw shaft 108. Upon shaft 108 a traveling member 109 is carried to which is secured an adjusting slider 110 arranged to short circuit part of the resistance 81 through conductor 111. The leads 86 and 87 of this potentiometer current standardizing motor will be connected to points A and B respectively. If desired where only one recorder is provided, or a standard cell is utilized with each potentiometer the recorder motor 74 may be utilized to drive shaft 105, by providing a cam actuated clutch driven from shaft 89 to throw shafts 71 and 108 in and out of driving relation with respect to the motor 74 at the proper times, so that when the brushes 90, 91 and 92 are in the recorder sector, the motor will be driving only shaft 71 and when these brushes are in the potentiometer sector, only shaft 108 will be driven. In this event the lead 83' will be connected to contacts 84 in the recorder and potentiometer sector. By connecting lead 60 to 67, 62 to 83, and 83' to L², the distributor may be removed and the contacting galvanometer made individual to one recorder.

The operation of the contacting galvanometer to control switches 31 and 32 has already been described. Assuming brush arm 88 to be on the sector for the recorder shown, in this position brushes 96 and 97 will be off contacts 94 and 95. If the position of slider 69 is such that the potential drop of the left hand section in Fig. 2 differs from the potential generated by the thermo-couple, which potentials are always opposed, a current will flow through the couple, conductor 67, contact 66, brush 90, ring 61, conductor 60, galvanometer 15, conductor 62, ring 63, brush 91, contact 82', conductor 83, left of slide wire 78, member 69, and conductor 68 to the couple. According to the direction of this current, needle 16 will deflect right or left, and will actuate switch 31 or 32, closing a circuit to the forward or reverse circuit of motor 74 through leads 58 or 59. This circuit will remain closed until contacts 35' and 36 are closed to open the actuated switch. While the switches 31 or 32 are closed, motor 74 will be rotated in the proper direction to restore the balance in the galvanometer circuit by adjusting the length of wire 78 in this circuit. As soon as the switch 31 or 32 is opened, the motor 74 stops. Shaft 89 is driven in properly timed relation with respect to cam shaft 1 so that one or more complete cycles of the contacting galvanometer occur during the interval that brushes 90, 91 and 92 remain in the sector. As member 70 shifts to balance the galvanometer coil, pen 75 is moved and traces a record of the change in conditions on sheet 77. The movement of arm 88 connects successive recorders in properly timed relation to the galvanometer circuit and switches controlled thereby.

At the proper time the arm 88 connects the potentiometer adjusting means in the circuit and at this time arms 96 and 97 will be on the proper contacts 94 and 95. In this position the potential drop across resistance 80 due to battery 79, and the potential due to the standard cell are opposed in the galvanometer circuit. If these potentials are unbalanced the galvanometer will be deflected and as at this time the other reversible motor 74 (not shown) driving shaft 105 is in the circuit closed by switch 31 or 32, slider 110 will be shifted in a direction to restore the balance of the galvanometer and will accordingly reestablish a standard condition in the potentiometer circuit.

To provide for establishing a complete balance in each circuit before the switches are shifted to the next set of contacts to connect in a new recorder or potentiometer set, a modification is shown in Fig. 3. Fastened to member 6 is a projecting spring contact member 112, and fastened to a fixed support is a co-acting spring contact member 113. Contacts 112 and 113 control a circuit through conductors 114 and 115, a source of electricity 116 and a stepping magnet 117. Magnet 117 actuates an armature 118 to which a stepping pawl 119 is pivoted. Pawl 119 is forced against ratchet wheel 120 by a spring 121. Wheel 120 is rigidly secured to and drives shaft 89 and a jockey roller 122 carried on a spring 123, or other suitable device is provided to properly position the distributor shaft at each step. Each actuation of magnet 117 will advance the switch one step, from one contact sector to the next. Contacts 112 and 113 are so positioned that so long as the galvanometer is deflected and actuates either contact 21 or 22, they will not engage as the movement of member 6 to the left when switches 31 or 32 close pulls contact 112 clear of contact 113. As soon as the needle 16 reaches central position, however, neither switch 31 nor 32 will be actuated and in the downward movement of 6, contact 112 will engage contact 113 and actuate magnet 117 to advance the arm 88 to the next set of contacts. It will be apparent that each recorder or controlled circuit will be brought to a balance in this manner, before the galvanometer and switches 31 and 32 are connected to the next controlled circuit.

Figure 4:
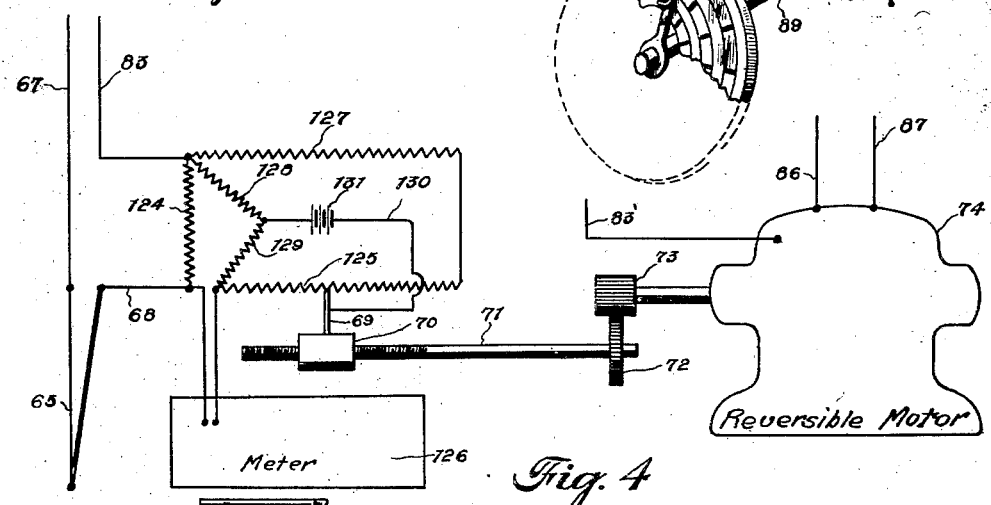
Fig. 4 shows the balancing rheostat and variable current recorder arrangement.

In Fig. 4, an arrangement for utilizing a balancing rheostat arrangement and a variable current recorder to replace the potentiometer recorders disclosed in Fig. 2 is provided. In this arrangement the leads 67 and 83 from contacts 66 and 82 are connected across a fixed resistance 124. A resistance 125 is substituted for slide wire 78 in Fig. 2 across which slider 69 carried by member 70 will move. Between resistances 124 and 125 a variable current recording meter 126 of any well known type is connected in series. A fixed resistance 127 is connected at one end to resistance 124 and at the other end is connected to resistances 125. Connected to the junction of resistances 124 and 127 is a resistance 128, which at its other end is connected to a resistance 129, in turn connected to the junction of resistance 125 and the recording meter. Connected from the junction of resistances 128 and 129 to the slider 69 by conductor 130 is a cell 131 which need not be standard, nor compensated against a standard cell as in the potentiometer arrangement. Leads 86 and 87 go to points A and B and lead 83' goes to other proper distributor contact 64.

In operation a current normally flows through from the cell 131 through 130, slider 69, the left end of resistance 125, through recording meter 126, resistance 124, resistance 128 to the cell 131. The potential drop across resistance 124 will be balanced against the potential generated by the couple and when these potentials are unequal the galvanometer will be deflected and set the motor 74 in motion in the proper direction to re-establish the balance in the galvanometer circuit by shifting the slider to vary the current flowing through the recorder and resistance 124. In this manner, independently of potential variations in the cell 131, the current maintained through resistance 124 is always directly proportional to the potential generated by the thermo-couple when a balance is effected in the galvanometer circuit, and the current flowing through the recorder 126 will produce an accurate record of the changes in the couple. The flow of current through the right section of resistance 125 and through 127 takes care of the superfluous electrical energy, and it is only necessary that cell 131 be at all times large enough to maintain sufficient current flowing through resistance 124.

Figure 5:
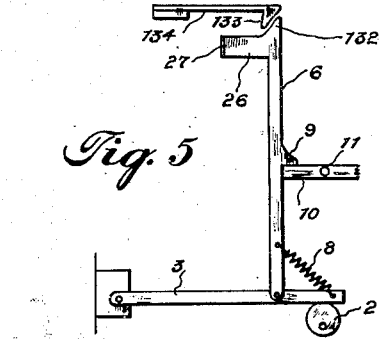
Fig. 5 shows a mechanical switch lock and release arrangement.

The releasing coils 52 and 56 of switches 31 and 32, together with contacts 35 and 36 may be eliminated and a mechanical catch arrangement substituted therefor, as shown in Fig. 5. In this event a cam projection 132 is secured to the member 6 and is arranged to engage a cam projection 133 carried by a flat spring 134. The springs 33 and 34 of switches 31 and 32 are eliminated in this form. When either of these switches is actuated member 6 will be forced to the left, forcing member 133 and spring 134 upward until member 134 can snap over 132 and lock member 6 to the left. As the member 6 approaches the limit of its downward movement, member 132 will drop below 133, and spring 8 will then move 6 to the right, in this manner opening the actuated switch. Certain improvements, and particularly improvements pertaining to and including the use of a single galvanometer in an association with a plurality of potentiometers or current meters, which are disclosed but not claimed herein, are claimed in my divisional application Serial No. 612,735, filed May 21, 1932.

While in accordance with the provisions of the statutes, I have illustrated and described preferred forms of embodiment of my invention, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent, is:

1. In an automatic system of control, a deflectable member, a periodically operating device engaging said deflectable member when deflected, an electromagnetic means jointly controlled by said deflectable member and said periodically operating device, and means controlled by said electromagnetic means to free said deflectable member from engagement with said periodically operating device.

2. In an automatic system of control, a deflectable member, a device periodically engaging with said deflectable member when deflected, means responsive to the engagement of said deflectable member with said periodically operating device, and means controlled by said means to release said deflectable member from engagement by said periodically operating device.

3. In an automatic system of control, a deflectable member, a switch device having a normal and an operating position, a periodically operating device arranged to engage said deflectable member for operating said switch device to its operating position, and means controlled by said periodically operating device for restoring said switch device to normal position.

4. In an automatic system of control, a deflectable member, periodically operating means engaging said deflectable member when deflected, a switch device having a normal and an operating position responsive to the engagement of said deflectable member with said periodically operating means for movement to its operative position, and means controlled by said periodically operated means for restoring said switch device to its normal position.

5. In a control system, a galvanometer including a deflecting member, a periodically operable member, motor driven means for moving said periodic member into engagement with said deflecting member when deflected and means engageable by said deflecting member and said periodic member for invariably disengaging said periodic member from said deflecting member following each of their engagements and for also variably controlling said control system in accordance with the deflection of said deflecting member.

6. In a control system, a deflecting member, periodically operating means periodically engaging said deflecting member when deflected, electro-magnetic means energized and locked by the engagement of said deflecting member and said periodically operating means at a period in the operation of said periodically operating means in accordance with the extent of deflection of said deflecting member and means for invariably releasing said last mentioned means following each engagement of the latter with said deflecting member at a predetermined period in the operations and means including circuit connections controlled by said electromagnetic means for variably controlling said control system in accordance with the deflection of said deflecting member.

7. In a control system, a deflecting member, periodically operating means for engaging said deflecting member, when the latter is deflected, electro-magnetic means energized by the engagement of said deflecting member and said periodically operating means at a predetermined period in the operation of said periodically operating means dependent upon the extent of deflection of said deflecting member and means for invariably releasing said last mentioned means following each engagement of the latter with said deflecting member at a predetermined period in the operation of said periodically operated means whereby said electro-magnetic means is energized for variable times depending upon the extent of deflection of said deflecting member and means including circuit connections controlled by said electromagnetic means for variably controlling said control system in accordance with the deflection of said deflecting member.

8. In a control system, a galvanometer having a deflecting member, a member periodically engaging said deflecting member when deflected, control means operated by the engagement of said deflecting member and said periodic member for variably operating said control system in accordance with the extent of deflection of said deflecting member and means responsive to the operation of said control means for disengaging said periodic member from said deflecting member.

9. In a control system, a galvanometer having a deflecting member, a member periodically engaging said deflecting member when deflected, control means operated by the engagement of said deflecting member and said periodic member for variably operating said control system in accordance with the extent of deflection of said deflecting member, and means responsive to the operation of said control means for disengaging said periodic member from said galvanometer member, whereby said galvanometer is free to operate in response to further changes while said control means is in operating condition.

10. In a galvanometer responsive to variable conditions, a deflecting pointer variably deflected by said galvanometer, means including a periodic member for periodically engaging said pointer when deflected, control means operated for a variable time by said pointer and periodic member in accordance with the extent of deflection of said deflecting pointer by said variable condition, means controlled by said control means for varying said conditions to a predetermined value and means whereby said galvanometer may operate said pointer in response to further variations of said conditions while said control means is varying said variable conditions.

11. In combination, a galvanometer having a deflecting member responsive to a variable condition, a periodically operating member for engaging said deflecting member, means controlled by the engagement of said periodic member with said deflecting member for varying the condition to which said galvanometer is responsive, means including a lever member for operating said periodic member periodically and means controlled by said first mentioned means for operating said lever member to temporarily render the second mentioned means incapable of operating said periodically operating member.

12. In combination, a galvanometer having a deflecting member, a periodic member having an operated and non-operated position, a source of power, a connecting means between said source of power and said periodic member for operating said periodic member when deflected to engage said deflecting member, said connecting means having a plurality of positions, in one of which it engages said periodic member for operation and in the other of which it releases said periodic member whereby said periodic member may restore to its non-operated position, electromagnetic means operated by the engagement of said periodic means and said deflecting member and means controlled by the operation of said electro-magnetic means for moving said connecting means to the position for releasing said periodic means whereby said periodic means is restored to its original position.

13. In combination, a galvanometer having a deflecting member, a periodic member having two extreme positions in one of which it engages said deflecting member when deflected and in the other of which it is out of engagement with said deflecting member, the the periodic member normally remaining in the second mentioned position, a source of power, a connecting member between said source of power and said periodic member, said connecting member having a plurality of positions in one which it is engaged to said periodic means for moving the periodic means to engage said deflecting member, means responsive to the engagement of said periodic means and said deflecting member and means controlled by said last mentioned means for moving said connecting means to disengage said periodic means.

14. In combination, a galvanometer having a deflecting member, a periodic member having two extreme positions in one of which it engages said deflecting member when deflected and in the other of which it is out of engagement with said deflecting member, the periodic member normally remaining in the second position, a source of power, a connecting member between said source of power and said periodic member, said connecting member having a plurality of positions in one of which it is engaged to said periodic means for moving the periodic means to engage said deflecting member, means operated responsive to the engagement of said periodic means and said deflecting member, means for locking said operated means in operated condition, means controlled by said last mentioned means for moving said connecting means to disengage said periodic member, a control means and means controlled by said connecting member for releasing said locked operated means after an interval of time in the cycle of operation of said periodic member.

15. An automatic control system comprising a galvanometer coil, a pointer movable to deflected position with said galvanometer coil, periodic means engaging said pointer and operative to move said pointer in a plane perpendicular to the plane of deflecting movement thereof with said galvanometer, control means for variably controlling said system in accordance with the deflected position of said pointer set into operation by movement of said pointer with said periodic means when said galvanometer pointer is deflected, and means directly controlled by said control means for freeing said pointer from engagement with said periodic means as soon as said control means is operated.

16. In combination, a control system, a contacting galvanometer having a deflecting pointer, cyclically operating means for periodically engaging said pointer when deflected, control means operated by the engagement of said galvanometer pointer and said operating means when said galvanometer pointer is deflected for variably controlling said control system in accordance with the extent of deflection of said pointer, and means for freeing said galvanometer pointer from engagement with said cyclically operating means to assume a new deflected position responsive to the operation of said control means.

17. In an automatic control system, a galvanometer having a deflecting pointer, a plurality of contacts the closing of which is controlled by the deflection of said galvanometer pointer, an individual control circuit closed by each of said contacts, means connected in said circuits for variably operating said control system, and further contacts in said control circuits actuated by the operation of said means to open said control circuits.

18. The combination as set forth in claim 17 in which said means connected in said circuits comprises electro-magnetic switch coils actuated in response to closure of said control circuits for making a control operation in accordance with the deflection of said deflecting pointer.

19. In an automatic control system, a plurality of control means each having a normal position, a galvanometer having a deflecting pointer, means controlled by said galvanometer pointer for variably actuating said plurality of control means from normal in accordance with the deflection thereof for variably operating said control system and means in operative relation with said control means for invariably restoring said actuated control means to normal.

20. In an automatic control system, a galvanometer having a deflecting pointer, mechanical means operating in cycles and engaging with said pointer, means actuated from a fixed position at different points in the cycles of operation of said mechanical means determined by the extent of deflection of said galvanometer pointer for variably operating said control system, means for restoring said actuated means to the fixed position at the same point in each cycle and means controlled by said actuated means for operating said mechanical means.

21. The combination as set forth in claim 20 in which said actuated means comprises a pair of electro-magnetic switches and in which said last mentioned means comprises an electro-magnetic circuit.

22. In a control system, a galvanometer including a deflecting member, a periodically operable member, motor driving means for moving said periodically operable member when deflected to engage said deflecting member, and means engageable by said deflecting member and said periodically operating member for invariably disengaging said periodically operating member from said deflecting member.

23. In combination, a deflectable member, periodically operable means for engaging the deflectable member when deflected, means responsive to the engagement of the member and the periodically operable means for disengaging the member and periodically operable means.

In testimony whereof I affix my signature.

T. R. HARRISON.